United States Patent [19]

Conkling

[11] 4,248,690
[45] Feb. 3, 1981

[54] APPARATUS FOR PRODUCTION OF SODIUM HYPOCHLORITE

[75] Inventor: William C. Conkling, Essex Fells, N.J.

[73] Assignee: Pennwalt Corporation, Philadelphia, Pa.

[21] Appl. No.: 115,644

[22] Filed: Jan. 28, 1980

[51] Int. Cl.$^3$ .................. C25B 9/00; C25B 15/08; C25B 1/24

[52] U.S. Cl. .................. 204/268; 204/270; 204/95

[58] Field of Search .................. 204/268–270, 204/95

[56] References Cited

U.S. PATENT DOCUMENTS

| | | | |
|---|---|---|---|
| 3,766,044 | 10/1973 | Westerlund | 204/268 |
| 3,785,951 | 1/1974 | Fleck | 204/268 |
| 3,873,438 | 3/1975 | Anderson et al. | 204/268 |
| 3,972,795 | 8/1976 | Goens et al. | 204/269 |
| 4,032,426 | 6/1977 | DeNora et al. | 204/269 X |
| 4,052,287 | 10/1977 | Westerlund | 204/268 X |

Primary Examiner—Howard S. Williams
Assistant Examiner—D. R. Valentine

[57] ABSTRACT

Device or apparatus for electrolyzing natural and synthetic brines for producing hypochlorite includes an improved chassis structure supporting and cooperating with electrode plates to form a series of electrolytic cells which are easily assembled into a cylindrical casing member to form an electrolyzer. The invention and/or apparatus is characterized by (a) rapid gas removal; (b) improved electrode plate configuration through which the electrolyte is caused to flow in a vigorous and turbulent manner to eliminate fouling of electrode arrays by precipitates and scales formed during electrolysis of natural brines; (c) novel dilution water distribution means for synthetic brine electrolysis; and (d) a series-parallel electrical conductor arrangement which is electrically balanced against changes in electrolyte temperature and salinity; all of which result in a highly efficient, economical, energy-saving, rugged, modular-type device.

26 Claims, 9 Drawing Figures

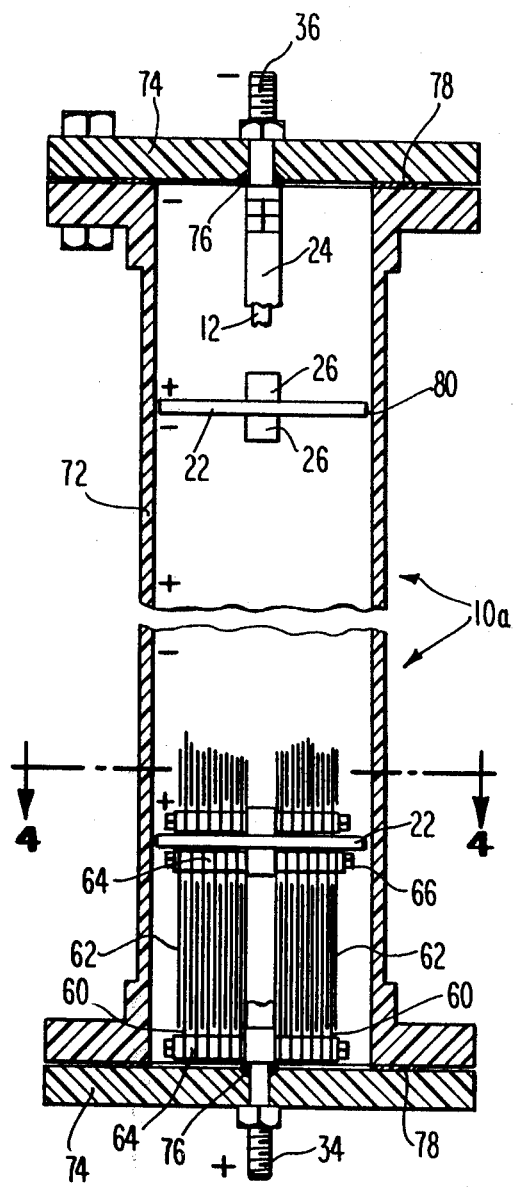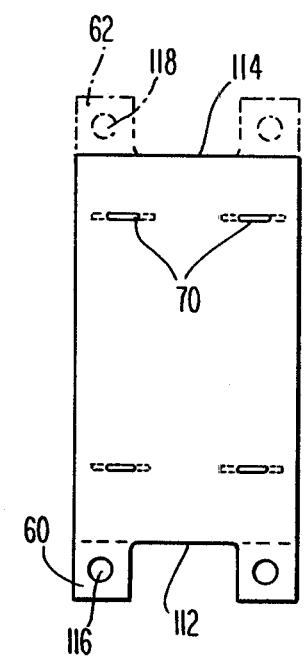
Fig. 3
Fig. 7

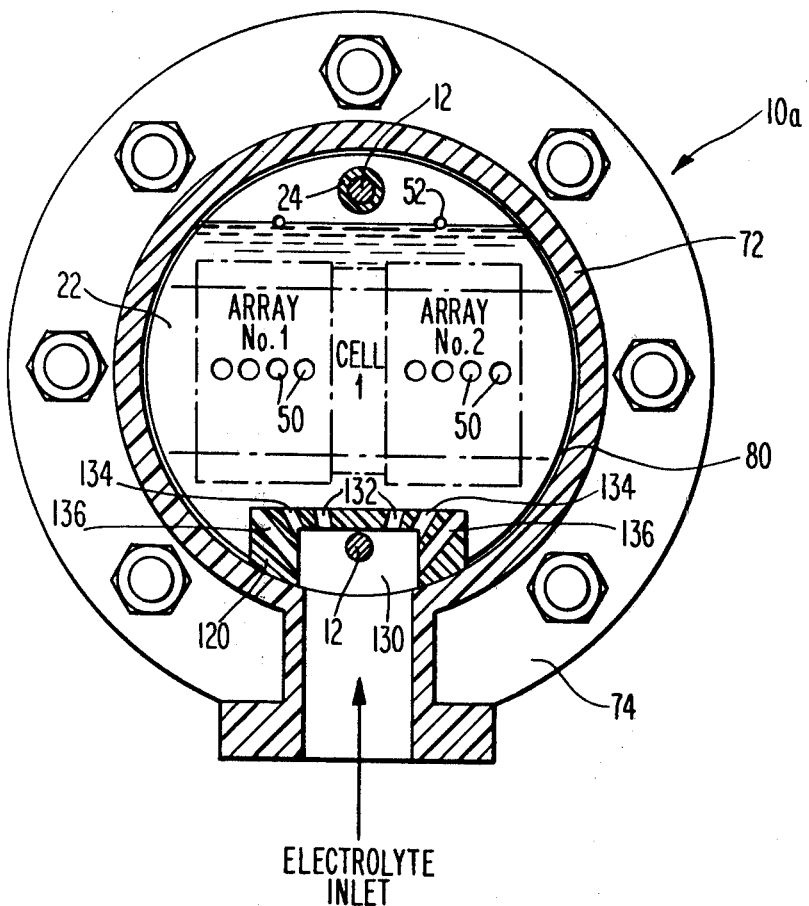
_Fig. 8_
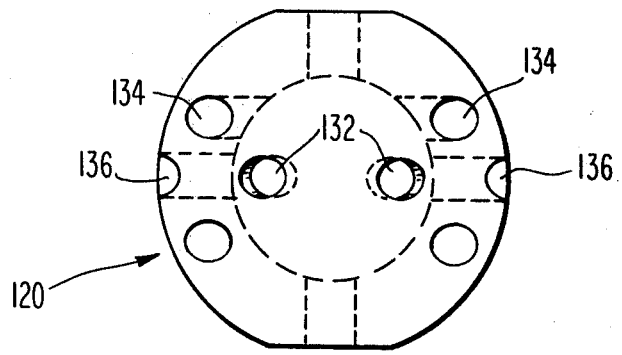
_Fig. 9_

APPARATUS FOR PRODUCTION OF SODIUM HYPOCHLORITE

STATEMENT OF THE INVENTION

This invention relates to an on-site electrolytic chlorinator and more particularly to improved apparatus for rapidly, efficiently, and economically making sodium hypochlorite from natural and synthetic brines with improved ease of operation and maintenance. Still more particularly, the invention relates to a novel open-type electrolytic cell, free of diaphragms or membranes for the electrolysis of sodium chloride solutions.

BACKGROUND AND SUMMARY OF THE INVENTION

The advantages of on-site electrolzers for the production of sodium hypochlorite from either synthetic or natural brines are obvious. For example, it is well known that modern sewage and water treatment facilities demand large quantities of chlorine as a biocidal agent. Chlorine, in the form of a gas or anhydrous liquid, poses hazardous risks in handling and storage. Even in the form of sodium hypochlorite, which is relatively safe to use, very large shipments of dilute solutions to the site of intended use present problems of storage and logistics.

Prior art electrolyzers of high electrical and salt efficiencies are generally complex and costly to manufacture and service. All present day electrolyzers employ anodes that wear out, i.e., they lose their catalytic coating and must frequently be completely disassembled and rebuilt. Furthermore, profuse numbers of connections often incorporated in the more sophisticated designs are potential sources of leaks of corrosive electrolyte which can be destructive, and of hydrogen which may collect in hazardous concentrations.

Power consumption is adversely affected by hydrogen gas accumulation in electrolyzers, leading to various add-on devices for separating the hydrogen from the electrolyte which contribute to additional system complexity.

Some available electrolyzers are very sensitive to scale buildup on electrodes due to the impurities in brines such as sea water. Acid cleanings may be necessary on a frequent basis further adding to maintenance cost.

It has been established by reliable investigations, and through experience, that low brine temperatures, typically 34° to 50° F., contribute to reduced anode coating life. High current densities also reduce the life of the precious coatings employed. Conventional electrolyzers are prone to undue reductions in anode life due to variations in conditions that are encountered when used over a wide range of services and geographic locations.

The present invention substantially overcomes the problems abovementioned while providing many related advantages and benefits. The electrolyzer comprises a plurality of electrolytic cells on a chassis inside a cylindrical casing resulting in a modular assembly which may be hydraulically serially connected with other duplicate modules wherein the entire cell structure of any electrolyzer may be easily and rapidly removed for repair thereof, or replaced with reconditioned or new parts preassembled outside the casings with minimal risk of assembly error.

The electrolyzers of the present invention are characterized by improved electrolyte flow paths and electrode plate configurations to resist scaling caused by brine contaminants. The electrolyzers are provided with improved means for removing gaseous products formed in the process of electrolyzing the brine solutions, possess unique and improved dilution water distribution means for extending anode life when electrolyzing synthetic brines and include an electrical conductor arrangement which is simple and yet provides substantially balanced power flow against changes in electrical resistance resulting from changes in electrolyte temperature and salinity to further extend anode life.

BRIEF DESCRIPTION OF THE DRAWINGS

FIG. 3 is a diagrammatic top view of the assembly of FIG. 1 including the electrolyzer casing and flanges.

FIG. 7 is a side view of electrode plates configured in accordance with the present invention.

FIG. 8 is a view similar to FIG. 4, partially sectioned, illustrating an inlet nozzle disc designed for use in sea water electrolysis.

FIG. 9 is a plan view of the inlet nozzle disc of FIG. 8.

DETAILED DESCRIPTION OF THE INVENTION

Figure 1:
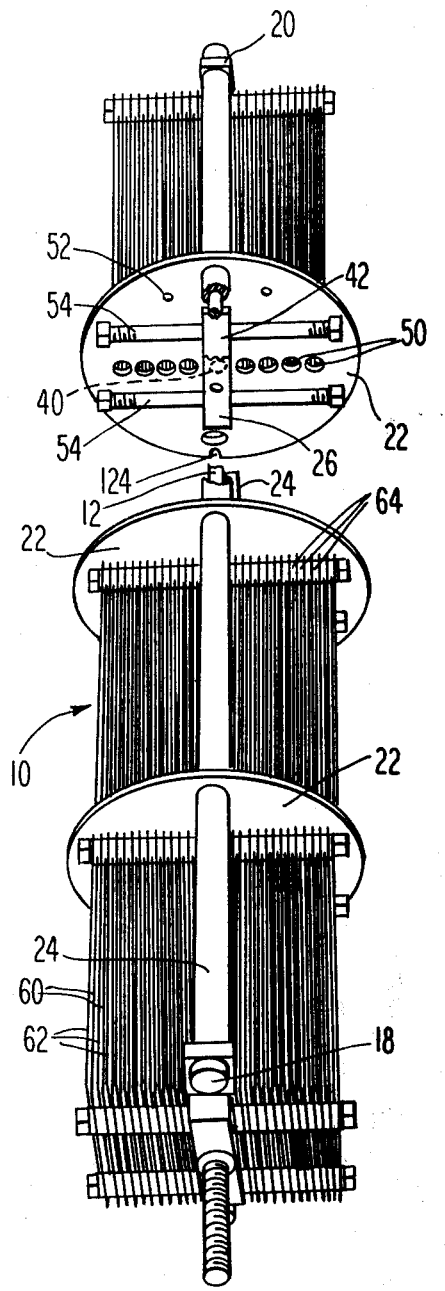
FIG. 1 is a partially cutaway perspective view looking down upon a typical electrolytic cell assembly of an electrolyzer of the present invention.

The electrolytic cell assembly of the present invention comprises a chassis and electrode assembly which are readily insertable into a casing and easily removable therefrom. The casing is provided with electrolyte inlet and outlet means and hydrogen venting means as well as access to conductors for impressing a direct current through the electrodes for electrolyzing natural or synthetic brines introduced at the inlet means. Blind cover flanges secured to the ends of the casing complete a single electrolyzer unit or module, a plurality of which may readily be connected in hydraulic series. Relief paths permit the gases formed during electrolysis of the brine in the individual electrolyzers to be conveniently bypassed to the discharge, to the atmosphere or to a collection manifold from whence they pass to downstream separation and release means.

A novel system of splitting the water used to dilute the concentrated brine in synthetic brine systems protects anodes from passivation. A novel arrangement of the electrical connectors of multiple electrolyzer arrays results in balanced flow of electrical current in parallel paths to further prolong anode life.

A. Chassis Assembly

More specifically, in FIGS. 1, 2, 3, and 4, electrolytic cell assembly comprises a chassis which includes a pair of tie rods 12 maintained in part in fixed spaced parallel relationship by means of bracket strips 14 and 16 secured near ends of the tie rods which are threaded to receive nuts 18 and 20. Bracket strip 14 and nuts 18 are electrically non-conductive, conveniently chlorinated polyvinyl chloride, hereinafter designated CPVC, whereas bracket strip 16 and nuts 20 are conveniently made of titanium. Although many of the individual components will be hereinafter referred to as titanium or CPVC components, it will be understood that the invention is not to be construed as limited to those materials.

Figure 2:
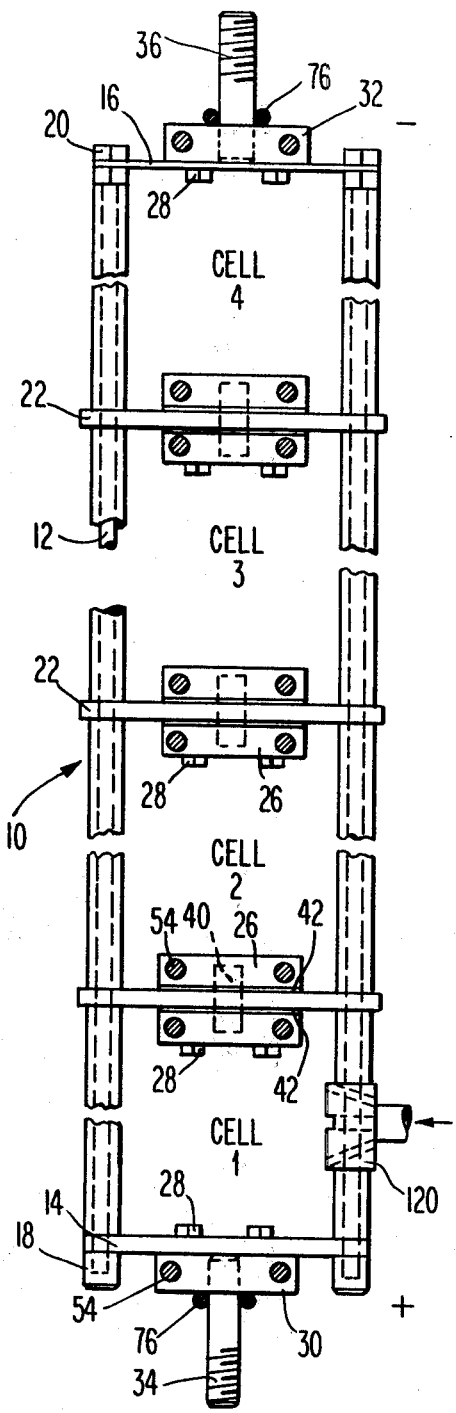
FIG. 2 is a diagrammatic side elevational view of the assembly of FIG. 1, the electrodes thereof omitted for clarity.

CPVC partitions 22 or partition discs, spaced evenly along the length of tie rods 12 also space the rods 12 and help form cell compartments or cells designated 1, 2, 3, and 4 (FIG. 2).

A cylindrical casing and end covers complete the bounds of the cells, later described. Each cell is comprised of, or fitted with, two arrays of spaced interleaved anode and cathode plates (FIG. 8), later described, to contribute to the formation of one working cell, or cell unit. CPVC tubular spacers 24 are fitted over the tie rods 12 and abut partition discs 22 and bracket strips 14 and 16.

Titanium electrode support blocks 26 are secured to each side of CPVC partition discs 22 by titanium screws 28. Electrode support blocks 30 and 32 are disposed at the electrically positive and negative ends respectively of the chassis assembly 10 and are secured to their respective bracket strips 14 and 16 by titanium screws 28.

End support blocks 30 and 32 are each provided with an interference fitted high electrically conductive conductor stud 34 and 36 respectively, suitably copper, which project through blind cover flanges to engage busbars, later described.

Electrode support blocks 26 are electrically coupled through each partition disc 22 by means of a tight-fitting copper or brass conductor 40. Electrolyte is sealed from conductor 40 through a flat elastomeric gasket 42 disposed on each side of each partition 22. Partitions 22 are provided with a plurality of horizontally disposed orifices 50 for passage of electrolyte therethrough and smaller orifices 52 above orifices 50 for the passage of mixtures of electrolyte and gases formed during electrolysis of the brine.

Nuts 18 are electrically non-conductive in order to resist coupling to the electrolyte flowing thereabouts, discussed hereinafter, and are disposed at the positive or high voltage end of the electrolyzer. Nuts 20 are electrically conductive in order to promote coupling with titanium spring bracket or bracket strip 16 which is, in turn, electrically coupled to the end electrode support block 32 at the negative end. If leakage currents should reach tie rods 12, i.e., at a juncture where spacers 24 abut partition discs 22, the current will be grounded immediately to the negative or low voltage side of the electrolyzer to thus prevent destructive electrolytic decomposition of the tie rods.

A pair of titanium clamping rods 54 is interference fitted transversely through each electrode support block 26 and end electrode support blocks 30 and 32 for supporting electrode plates, later described.

B. Electrode and Electrolyzer Assemblies

Referring additionally to FIG. 7, the electrode assembly comprises the chassis assembly aforedescribed, anodes 60 and cathodes 62 in spaced interleaved relationship, clamping washers 64, clamping nuts 66, plastic beading spacers 70, and miscellaneous fasteners, fittings, and the like.

The electrode assembly is insertable as a unit into a CPVC cylindrical casing 72 which mounts a blind flange 74 at each end thereof to form an electrolyzer or electrolyzer module 10a. O-rings 76 and gaskets 78 contacting blind flanges 74 provide watertight seals within electrolyzer 10a when the flanges are fastened in place with nuts and bolts (not shown).

Figure 4:
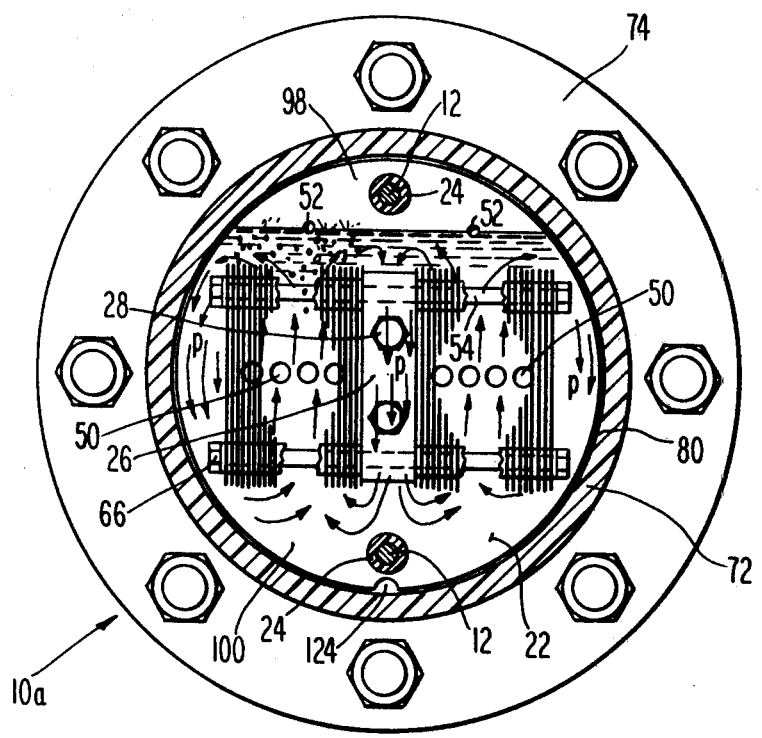
FIG. 4 is a sectional view of the electrolyzer of FIG. 3 taken along line 4—4 thereof, parts omitted for clarity.
Figure 5:
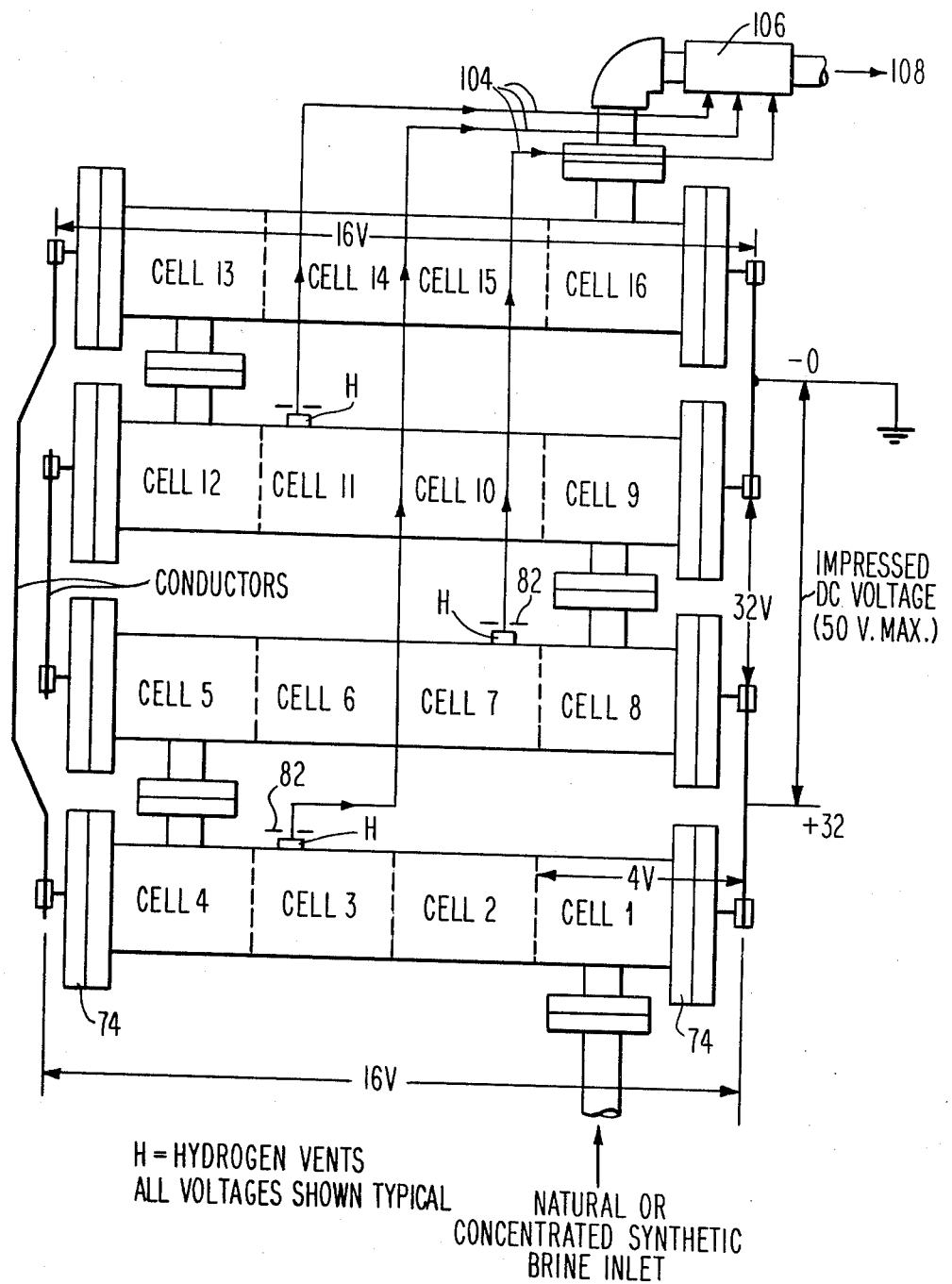
FIG. 5 is a diagrammatic representation of flow paths of hydrogen and electrolyte, through electrolyzers disposed in an hydraulically serially vertically stacked arrangement including a suitable electrical conductor arrangement.

Each cell of an electrolyzer 10a is fitted with a pair of arrays of anode and cathode plates, designated Array No. 1 and Array No. 2 in FIG. 8, which arrays contribute to the formation of one of a plurality of working cells designated cells 1, 2, 3, and 4 in FIGS. 2 and 6, and 1 through 16 in FIG. 5.

In addition to electrolyte flow between the cells through orifices 50 in partitions 22, and for ease of assembly, a circumferential space or passageway 80 is provided between partitions 22 and casing 72 by virtue of the former having a diameter slightly less than the inside diameter of the latter, typically about 0.016".

The electrode assembly employs anode plates 60 of a type commonly called dimensionally stable, having a titanium substrate, for example, with a surface coating of a solid solution of at least one platinum group metal oxide on both sides thereof. The conductive substrate is preferably a valve metal such as titanium. Tantalum, niobium or zirconium however may also be employed. The form of the substrate may be plain, imperforate or foraminous, the plain being preferred. The coating may be an oxide of platinum, palladium, ruthenium, iridium, rhodium, or osmium, or combinations thereof. The exact composition of the anode plates is not critical to the present invention and is not claimed herein, it being understood that dimensionally stable anodes of various compositions are well known and have been employed successfully over the years.

Cathodes 62 may be fabricated conveniently of sheet and will typically be titanium, nickel or various ferrous and nickel alloys. As with anode plates, plain sheet cathode plates have been found superior to imperforate or foraminous sheets for use with embodiments in the present invention.

All anode plates 60 and cathode plates 62 are vertically disposed or oriented and maintained in fixed alternate spaced relationship by means of clamping washers 64 inserted between successive anode plates and similar washers 64 inserted between successive cathode plates. The electrode plates and clamping washers are inserted over clamping studs or rods 54 (FIG. 1). Clearance between plates is maintained in the range between about 0.031 to 0.062". When clearances are less than about 0.031", fluid drag and/or gas bubble bridging inhibit proper flow of electrolyte and gas, as well as subjecting the system to clogging by particulates and/or scale. When spacings between plates are excessive, or greater than about 0.10", for example, longer electrical paths therebetween are incurred and hence greater electrical losses result.

Anode plates 60 are clamped at the positive or higher voltage ends of each compartment or cell unit and the cathode plates at the lower voltage ends (FIG. 3). The anode and cathode plates are interleaved and provide a predetermined gap or space between surfaces. Geometrically opposing anode and cathode surface areas define the effective working areas or generation zones. Unopposed surface areas and outside areas of outer electrodes are essentially ineffective for production purposes since a very high percentage of the electric current will traverse the short paths, i.e., between opposing anode and cathode surfaces. The outer plates may be either anodes or cathodes, the latter being preferred since the ineffective use of one side of an anode plate represents a waste of a precious coating.

As aforementioned, each compartment or cell unit includes two spaced arrays of interleaved electrodes which are securely clamped to opposing electrode support blocks 26 through clamping rods 54, clamping washers 64 and clamping nuts 66, all of which additionally function as electrical conductors to the electrodes.

Spacing between electrode plates is controlled by the thickness of precision machined clamping washers 64, suitably titanium, and by plastic beading or electrically non-conductive spacers or separators 70, typically polytetrafluoroethylene.

The chassis and cell configuration provides what is generally termed a bipolar arrangement characterized by cells serially connected electrically and hydraulically internal of the casing for improved efficiency, simplicity and cost.

Casing structures 72 are conveniently cemented or welded CPVC, and typically, of 6" or 8" diameter. Brine enters casing 72 at or near one end thereof and is discharged at an opposite end. It may pass through standard connections into another elecrtrolyzer or electrolyzers, (FIG. 5) typically arranged in vertical arrays, in a manner which insures series flow through each cell compartment of each hydraulically connected electrolyzer. Typically, the inlet will be found at the bottom of one casing and the discharge port at the top of another when several electrolyzers are vertically stacked in hydraulic series.

The novel electrolyzer provides a module from which a wide range of system capacities can be constructed. Typically, one to four electrolyzers can be simply connected hydraulically in vertical stacks and one or more stacks can be connected hydraulically in parallel. Various series-parallel arrangements of electrical connections, described later, are employed. Conventional metal framing and bracketing is used to support and anchor the electrolyzers.

The top and bottom casing connections permit the blind end flanges 74 to remain unencumbered of plumbing fittings to facilitate rapid insertion and removal of electrode assemblies. Simple electrical conductors need only be removed to provide access to the covers and chassis assemblies. Further, vertical stacks are efficient in terms of floor area. It is understood that the number of cells per electrolyzer and the number of electrolyzers per stack shown and/or described herein are not intended to be limiting.

Orifices 50 and 52 provided in partition discs 22, as well as the discs themselves, aid in controlling the flows of electrolyte and gas and help regulate electrolyte levels and velocities. Partition discs 22 serve two additional important functions; i.e., of reducing intercell coupling, a parasitic phenomenon, to an insignificant level and the preventing of back-mixing of electrolyte between cells, a phenomenon that encumbers process efficiency as is familar to those skilled in the art.

C. Synthetic and Natural Brine Systems Operation

In the instance of natural brine systems, electrolyte typically enters the bottom of the electrolyzer, or the bottom of the lowermost module, and sequentially floods the cells and flows out the discharge at the top of the apparatus, urged through by inlet pressure. In synthetic systems, concentrated brine and dilution water are brought into the electrolyzer through separate connections, described later. The mixture is likewise urged to the discharge at the top of the apparatus by the inlet pressures.

In both synthetic and natural brine systems, the preferred approach to high electrical efficiency is a once-through mode of operation, as opposed to recycling of the electrolyte. Recycling tends to "contaminate" the low strength upstream product with the high strength discharge which helps to promote an undesirable competing reaction in the electrolyzers, a phenomenon familiar to those versed in the art. The plurality of partition discs 22 serve as baffles and effectively prevent back-mixing of electrolyte between cells, thereby contributing to the minimizing of the undesirable competitive reaction.

The once-through mode of operation and the desirability of converting a substantial percentage of relatively costly synthetic brine to product dictate relatively low electrolyte flows in synthetic systems. Therefore, intracell flow is low with correspondingly low potential for high jet energy issuing from the orifices of the partitions 22 for creating beneficial turbulence and electrode scouring action on surfaces in the downstream electrode arrays to aid in suppressing impurity buildup. This is not a significant disadvantage since synthetic brines can be readily made from salts and water of sufficiently high quality to greatly minimize electrode scaling and coating and the need for turbulence and scouring.

In the natural brine systems, brine cost is low or practically non-existent, and, as is familiar to those skilled in the electrolytic process, the economics of such operation dictate much higher brine flows than in synthetic systems, on the order of 5 to 10 times higher. Further, sea water and other natural brines contain large quantities of extraneous chemicals that precipitate and plate out and tend to lodge on the electrodes of the cells, thus interfering with efficient operation. The high flows in combination with electrode arrays of novel configuration, described later, are combined to attain efficient long term operation unencumbered by troublesome scales and deposits.

Direct current power is applied to the conductor studs 34 and 36 to provide a positive e.m.f. of nominally 3.5 to 6.0 volts on the anode end of each cell (relative to the cathode end). Each electrolyzer module of 4 cells typically requires a total impressed DC voltage of from 14 to 24 volts.

Electrolyte flows serially through compartments or cells principally through intra-casing connections, orifices 50 in partitions 22 and to a much lesser degree through annular clearances or passageways 80 and orifices 52. As illustrated in FIG. 4, there is a vigorous convection flow vertically upwardly between the electrode plates within the cell during electrolysis due in some measure to heating (heat of inefficiency) occuring between electrode plates but much more effectively to gas formation, predominantly hydrogen. The dual action of heat and gas formation provide a vigorous lift (similar to vigorous boiling) to the electrolyte aided by generous return paths for rapid convection of the electrolyte which improves electrical efficiency, since the gas, a nonconductor of electricity is quickly removed from the generation zone. It is an important feature of the present invention that gas be rapidly removed from the generation zone to a zone immediately above the electrode arrays. The gas is separated from the electrolyte and progressively led from the cell compartments as described later. The process that takes place within the electrolyzer is quite complex and conventional and documented in the literature. In the main, sodium hypochlorite and unconverted brine are produced in mixture along with gases, predominantly hydrogen.

Figure 6:
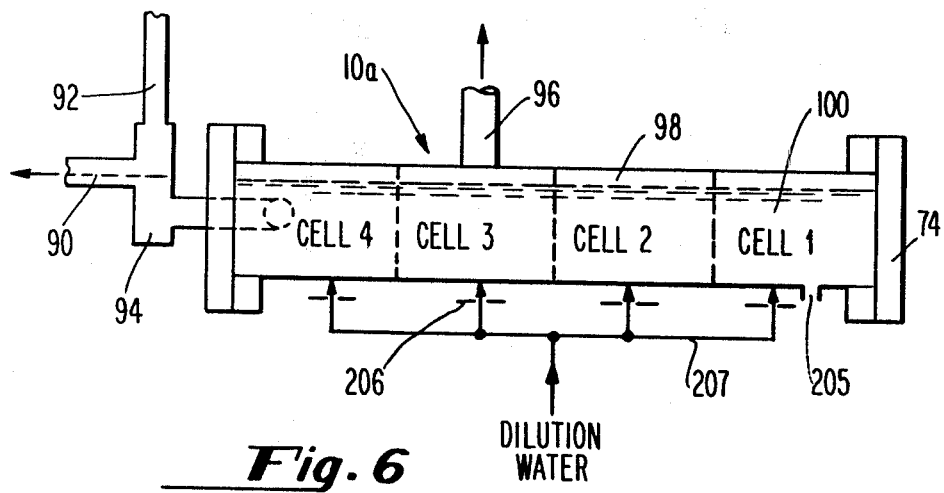
FIG. 6 is a diagrammatic illustration of a single electrolyzer utilizing typical dilution water distribution into individual compartments or cells.

FIG. 6 illustrates one particular application of the novel electrolyzer adapted for synthetic brine operation using a single electrolyzer module operating under atmospheric pressure. As described above, flow through the electrolyzer 10a is very low in synthetic systems. Flow orifices 50 and 52 are sufficiently large such that the head losses across partition discs 22 are imperceptible. With the gas vent port 96 and the product discharge connection 90 both under atmospheric pressure, the overflow trap 94 regulates the level in the entire electrolyzer to the approximate level in the discharge conduit 90.

In other embodiments of the electrolyzer and electrolyzer stacks, the casings are typically at operating pressures above atmospheric due to fluid friction in the electrolyzers and to static and dynamic heads or backpressures at the discharge. Alternate means of controlling the head in the electrolyzer and of leading the gas from the gas zones are used and are described later.

D. Gas Removal

The gas generated between the electrodes has a first order effect on the electrical resistance in the electrode gaps of the generation zones and a pronounced effect on overall power efficiency and consequently on operating cost. Generally, the smaller the anodes in the vertical dimension the shorter the gas flow path out of the generation zone and the greater the efficiency of gas removal. However, very narrow electrodes imply low electrode area and high electrolyzer cost. A compromise in first cost versus gas removal efficiency as they relate to the vertical anode dimension must be made. Similarly, excessively long electrodes result in high current densities at the attachment ends of the electrodes resulting in undesirably high electrical resistance losses and/or excessively massive electrodes.

Typically, anodes of $0.031'' \times 4'' \times 8''$ have been found to be of favorable proportions in relation to the above factors.

In addition to the length-of-path consideration, high rate convection currents are promoted by the three generous return paths, p (FIG. 4) to further provide rapid removal of gas from the generation zone. In furtherance of efficient convection, the anodes must be submerged to properly exploit chimney effect. To promote separation of the gas bubbles and to avoid recirculating them back to the bottom, and up through the electrode arrays, a substantial interface with the gas zone and electrolyte must be maintained in the form of electrolyte surface. Except for the synthetic arrangement of FIG. 6, this surface is maintained in the electrolyzers by two mechanisms:

(a) the substantial quantity of gas separating in the top of each cell compartment is trapped by casing walls 72, flanges 74, and partition discs 22, causing the electrolyte level to be urged downwardly; and (b) when the electrolyte level reaches the level of gas orifices 52, the orifices are uncovered of electrolyte to a sufficient degree to pass the gas through to the next downstream compartment and prevent further depression of electrolytic level.

This regulation of level prevails in all compartments except the compartments with top-mounted discharge ports. Gas orifices 52 are relatively small, typically 1/16'' to ¼'', which size is sufficient to pass all of the gas generated in a given compartment plus additional incoming gas from upstream cells plus a minor amount of electrolyte, e.g., 0 to 5%.

Gas is urged by fluid pressure from compartment to compartment until reaching a vented (or discharge) compartment of the electrolyzer module where the surface is not regulated and depressed. The gas becomes entrained with the electrolyte and gas of the vented (or discharge) compartment and flows out the discharge port to external separation means or, when a downstream module exists, flows into the first compartment of the next module where separation is again affected within that compartment. In one arrangement of multiple modules (FIG. 5), gas progresses longitudinally from compartment to compartment until reaching a top-mounted gas vent H, typically in a penultimate compartment. A limiting orifice 82, typically 1/16'' to ⅛'', is of sufficient size to bleed the gas and a minor flow of electrolyte, typically 0-2%, out of the electrolyzer array thereby relieving downstream cells and modules of the burden of separating and handling reentrained gas.

In stacked arrays with multiple vent points, the multiple gas bleed conduits, typically, are connected to a common manifold in the proximity of the discharge of the last or top-most electrolyzer module. The manifold connects to the product discharge line and leads the gases back into mixture with the product which is a combination of sodium hypochlorite, unconverted brine and residual gas. The mixture is then led to external separation means wherein a virtual 100% separation is normally accomplished.

FIG. 5 illustrates a four module electrolyzer array which, along with FIG. 4, illustrates the principals recited above. The lines 104 from fitting H to manifold 106 depict conduits, e.g., plastic tubing which lead the gas-electrolyte mixture to the electrolyzer array manifold 106 and discharge 108. Orifices 82 restrain the flow to prevent excessive bypassing of unconverted electrolyte. In the case of the single module analyzer of FIG. 6 operating at atmospheric pressure, hydrogen separates from the electrolyte at its surfaces in the four cell compartments and flows to the vent 96 from each end of the electrolyzer from whence it is vented to the atmosphere. Gas and electrolyte zones are shown as 98 and 100 respectively. In a single electrolyzer of the enclosed type (non-atmospheric), typically, the gases separate out in the upstream compartments, flow through the topside orifices 52 until they reach the discharge compartment wherein they mix with the fluids of that compartment and flow out the electrolyte port. With the gases entering at the top of the discharge compartment, in the proximity of the discharge port, very little gas is reentrained in the electrolyte to interfere with the generation process in the discharge cell compartment.

The quantity of gas that evolves is predictable from the related electro-chemistry. The throughput of electrolyte is typically regulated to a fixed rate. Pressure losses through electrolyte orifices and passages and gas orifices and passages are substantially equal since parallel paths are used. Thus the orifices and passages can be readily sized to provide the distributions described above by those skilled in fluid flow practice.

E. Electrode Plate Configuration

As aforementioned, sea water contaminants result in the formation of deposits on internal cell surfaces, which, if not removed, interfere with electrolysis. These deposits, predominantly calcium and magnesium hydroxides and carbonates can form at a dramatic rate, especially on cathodic surfaces and edges. When employing conventional rectangular electrode plates, opposing electrode surfaces were found to remain quite scale free, i.e., films of only 0.004" to 010" would develop over periods of 6 months or more on a sea water of medium quality, i.e., sea water from a tidal canal located in a moderately built-up area with a mixture of industry and commerce. The sea water was 85% of full strength, the dilution resulting from local runoff. The scale within the electrolysis zones did not significantly affect operation. Outside cathode surfaces, i.e., those surfaces unopposed by anode surfaces, took on thicker and more tenacious coatings of approximately 0.030" to 0.060" in the same period of time, but at a diminishing rate approaching a stable condition. The location of the coatings did not interfere with electrolyte flow or power flow or with efficiency to any measurable degree. However, gross buildups of soft precipitates tended to occur at both upper and lower electrode edges of the vertically disposed electrode arrays bridging from one electrode edge to adjacent edges. In addition, at those areas between anode plates where cathode plates are not in direct opposition thereto, i.e., at the positive attachment ends of anode arrays, solid bridging would occur in a matter of hours and persist even in the presence of electrolyte velocities of 10 ft./sec. or more issuing from flow orifices 50. This phenomenon of solid bridging or packing of precipitates between anode plates similarly occurs between cathode plates unopposed by anode plates at their attachment ends but to a lesser degree. Also, approximately the most distal 1/16" of the anode plates were found to be bridged at their unattached ends.

In essence, each of the four sides of all electrode arrays fitted with conventional rectangular plates was sealed to a severe degree by buildup of solid impurities precipitating out of solution. This packing and bridging encumbered the circulation of the electrolyte between plates, thereby interfering with efficient electrolysis. To substantially eliminate this undesirable phenomenon, each anode plate 60 is provided with a substantially rectangular notch 112 and each cathode plate 62 is identically notched at 114 (FIG. 7). Each notch is centered between the electrode plate attachment points and comprises approximately 50% of the vertical height of the plate in its vertical dimension. The remaining end area of each plate serves to conduct current and to support the cantilevered plate. The depth of anode notch 112 is such that its vertical edge is coextensive with the free or unattached end of cathode plate 62, and conversely, the depth of cathode notch 114 is such that its vertical edge is coextensive with the unattached end of anode plate 60. Notches are typically 1"×2" for 0.031"×4"×8" electrodes. Because of the notches, unopposed surfaces in the region of the submerged jets issuing from the partition orifices 50 are effectively eliminated and a flush array of electrode edges is provided. It was discovered that a plurality of orifices 50 could be sized and uniformly spaced to produce impinging velocities at the vertically aligned upstream electrode edges to scour off interfering scales and buildups and to impart sufficient flow and turbulence through the gaps between the electrodes to deter buildups and scales at the other three edges of the electrode arrays.

By regulating the electrolyte throughput to the electrolyzers with conventional external flow regulating means and by properly sizing orifices 50, the issuing velocities are readily fixed. Velocities of from 5 to 20 ft. per sec., typically 10 ft. per sec., were found effective. Orifice diameters 50 are typically $\frac{1}{4}$" to $\frac{3}{8}$", and brine throughputs are typically 30 to 120 G.P.M. in arrays of casings of four cell electrolyzers of 6" or 8" diameter.

Vertical convection flow driven by the temperature rise due to the inefficiencies of electrolytic conversion and by gas lift add to turbulence and total resultant flow. Total resultant flow is the product of both horizontal orifice 50 flow and vertical convection flow. The product flow effectively keeps electrode edge openings about 90% free of buildup as compared to about 25% or less with conventional electrodes over long periods of operation. Gas is removed from the generating zone at a rapid rate.

Some precipitates tend to settle to the bottom of electrolyzer casings. A crescent-shaped notch 124 at the lowermost portion of partitions 22 (FIGS. 1 and 4) functions as a cleansing jet to entrain these precipitates for subsequent discharge.

Since there is no partition disc 22 ahead of the first upstream compartment or cell No. 1, i.e., no orifices 50 to cause high velocity jets to be directed at the edges of the electrodes, an inlet nozzle disc 120, supported by the lower of tie rods 12 and in slidable contact with lower wall portion of casing 72, causes high velocity jets, typically 5 to 20 ft./sec. to be directed at the lower edges of the electrode plates when electrolyte is caused to flow through inlet nozzle disc 120.

Inlet nozzle disc 120 is illustrated in FIGS. 8 and 9 and shown in the electrolyzer assembly FIG. 2. Inlet nozzle disc 120 is employed in the electrolysis of sea water only and is disposed in cell No. 1, or that cell or compartment having the brine inlet means when only a single electrolyzer is being employed or in each inlet cell of each electrolyzer module of stacked or multiple electrolyzer systems. When synthetic brine is electrolyzed, inlet nozzle discs are not furnished.

Disc 120 is provided with a cylindrically shaped inlet cavity 130 and a symmetrical body portion including a plurality of spaced orifices 132, 134 and 136 directed toward the bottom edges of the electrode arrays thereabove and having axes forming progressively larger angles from a vertical axis as the periphery of the nozzle disc is approached. Electrolyte enters inlet cavity 130 and is forced through orifices 132, 134 and 136 to impinge on the lower edges of array No. 1 and array No. 2 to produce the required high velocities and turbulence within the cell to thereby prevent buildup of undesirable precipitates.

F. Dilution Water Distribution Means for Synthetic Brine Systems

Since the precious coatings of the anodes are, by far, the most costly elements of hypochlorite generation apparatus, any reasonable measure that contributes to longer life of the coating is justifiable. The novel brine feed method described below insures moderated temperatures for synthetic brine systems for cold water supplies without recourse to external heaters, heat exchangers and the like and consequently greater anode life.

Referring again to FIG. 6, the system incorporates a concentrated brine(NaCl) connection 205 into the first compartment of the electrolyzer series string of compartments. The total dilution water flow is typically about 10 times as great as the concentrated brine flow to reduce final salinity to approximately 2.8%.

The dilution flow is split into two or more streams, typically four equal streams, and introduced into the electrolyzer cell string at approximately equal intervals over the length of the cell string. As a result thereof, graduated levels of salinity are provided along the cell string, typically 8.5, 5.0, 3.6 and 2.8%, as well as relatively low axial average electrolyte flow velocities in the upstream cells with increasing velocities as dilution water is added. Correspondingly, residence time is of longer duration initially but becomes reduced as each increment of dilution water is added. A longer residence time results in more heating (from electrical losses) and more product formation in the upstream compartments compared to simple systems with no dilution water splits.

Typical data for a four split system and for a conventional system (wherein the concentrated brine and dilution water are combined before entering the electrolyzer) are as follows:

|  | 1st Quarter Stage | 2nd Quarter Stage | 3rd Quarter Stage | 4th Quarter Stage |
|---|---|---|---|---|
| With Splits |  |  |  |  |
| Temp. rise, °F. | 20 | 1 | 2 | 5 |
| Chlor. Str., g/l | 8.7 | 9.1 | 8.9 | 9.0 |
| Conventional (Without Splits) |  |  |  |  |
| Temp. °F. | 6 | 7 | 7 | 8 |
| Chlor. Str., g/l | 2.5 | 4.8 | 7.0 | 9.0 |

The above data are approximate for the end of the stage (end of the quarter cell string). The temperature rise is the total rise from the beginning-of-stage temperature to the end-of-stage temperature. The chlorine strength is the strength at the end of the stage.

Additionally, voltage is quite different for the two systems due to salinity and temperature. Voltage requirements decrease with an increase in salinity and/or temperature. Typically, voltage required for the four split mode for four cells is approximately one volt less than for no splits; i.e., 14.1 volts versus 15.1 volts.

The net effects of the two systems may be summarized as follows:

a. The higher average salinity of the split system reduces overall voltage requirements and aids the electrolytic conversion process as a result of the greater average density of chlorine ions.

b. The higher average temperature of the split system may help or hinder the electro-chemical process depending upon the temperature of the inlet brine, dilution water and total temperature rise. In practice, electro-chemical conversion using the split system tends to be more efficient due to the higher average electrolyte temperature resulting in decreased voltage requirements.

c. Higher average hypochlorite strength detracts significantly from efficiency due to the accentuation of the competing reaction. Thus the split system is at a disadvantage as a result of this phenomenon.

Overall, it has been found that efficiencies, electrical and salt in combination, for the two modes of operation, are approximately equal. Under some conditions the split system provides slightly better results while the alternate system was found to be more efficient for others. In the split system, however, there is the larger initial temperature rise than in the first cell(s) thereby exposing anodes in the upstream cells to higher more favorable temperatures than in the conventional system. For example, in a four cell string with four splits, if the supply water temperature is 34° F., the temperature of the mixture in the first cell would be 54° F. as opposed to a temperature of 40° F. for the conventional system. The costly anode coatings are thereby better protected from passivation due to excessive oxygen formation from exposure to cold electrolyte as is known to those familiar with the electro-chemistry.

The dilution flows for the split system need not be precise, typically within ±10% of each other, and are regulated by simple flow restrictors 206 in the dilution water supply plumbing 207 providing parallel paths for the dilution streams.

It is appreciated that the present dilution water split means is not intended to be limited to 4 splits, equal dilution water splits, equal spacing of applications of dilution water, or 4 cell electrolyzers. Beneficial temperature results are obtained with various combinations of the above variables with the resulting conditions being altered only in degree.

G. Electrical Conductor Arrangement

Long strings of cells connected in hydraulic series are desirable to provide maximum process efficiency, since, in essence, back-mixing (non-plug type flow) with its attendant loss of efficiency, familiar to those skilled in the art, is effectively reduced. The greater the number of cells and cell partitions, the more closely plug type flow results are approached. 16 or more cells in hydraulic series has been found to be desirable to exploit fully the principal of once-through plug flow operation.

Simple series electrical connections for the cells and modules for strings of cells of such lengths are undesirable because of the high voltages that result.

A total impressed DC voltage of up to about 50 is considered safe in terms of human exposure to uninsulated conductors in industrial electrolytic type apparatus. Where high currents are involved, as in the present apparatus, typically 500 to 10,000 amperes, uninsulated busbars with their ability to dissipate heat are desirable. Thus, eight cells in electric series comprise a practical maximum since it may be desirable to apply up to 6 volts per cell. When 16 cells are hydraulically connected in series (FIG. 5), an electrical series-parallel arrangement is desirable. Conventionally, the downstream 50% of the cell string would be connected serially and the upstream 50% of the cell string would be connected serially. These cell strings would then be coupled in parallel with an external power source. In the system of FIG. 5, connecting 8 upstream cells in electrical series and 8 downstream cells in electrical series and the two resulting electrical series sets in parallel would provide a conventional solution, but an unbalanced electric current flow in the system, which would tend to degrade anodes due to excessive current density. In a conventional system not employing split water dilution means, current tends to be excessive in the downstream cells due to higher electrolyte temperatures therein resulting in lower electrical resistance. In a split dilution water system as discussed above, higher salinity within the upstream cells causes a lower electrical resistance and an excess of current to be shunted therethrough. Higher current in one "leg" of the cell string subtracts from the current passing in the alternate leg, thus accentuating the imbalance therebetween and resulting in imperfect anode wear and accompanying economic loss.

More satisfactory life over a wide range of operating conditions results when the arrangement diagrammatically represented in FIG. 5 is employed, which arrangement balances differences in the electrical resistance due to changes in temperature and/or salinity of the electrolyte as it progresses through the compartments.

In accordance therewith, symmetrical arrays of cells or modules, divisible by four, are grouped for power flow such that 25% of the most upstream cells are coupled electrically serially with 25% of the most downstream cells. The remaining 50% (intermediate-stream) cells are likewise coupled serially such that two serial groups (upstream-downstream and intermediate-stream) will be substantially equally matched in terms of resistance to result in essentially balanced current flow when powered from the same source. It is appreciated that the arrangement discussed above is applicable to cell strings having other than 16 cells, and, in fact, to cells of dissimilar geometry in other than symmetrical numbers in parallel.

H. In Summary

Apparatus is herein presented and described which is capable of electrolyzing natural and synthetic brines for the production of sodium hypochlorite. The apparatus employs a multi-cell once-through mode of electrolyte flow as opposed to recirculation. The apparatus is easily dismantled and reassembled for servicing, i.e., for inspection, cleaning or replacement of parts. Chassis mounted electrode assemblies of up to 8" in diameter by 3 feet in length may be lifted and handled conveniently by one person and inserted into a casing to provide an electrolyzer or electrolyzer module. The chassis assembly may be characterized by its simplicity, bipolarity and modularity. The electrolyzer configuration is such that hydrogen removal is rapid to contribute to the high electrical efficiency of the apparatus. The electrode configuration and the regulated flows of the electrolyte contribute to the substantial elimination of scale and precipitate buildup. In addition to the above labor and energy saving features, the unique and improved dilution water distribution means and electrical conductor arrangement provide for reduced wear of critical and costly anodes.

I claim:

1. Electrolyzer apparatus for electrolyzing synthetic and natural brines for producing hypochlorite therefrom comprising
a. an elongated electrically non-conductive casing having a horizontally disposed longitudinal axis, said casing having unobstructed openings at both ends thereof,
b. removable cover means secured to each of said casing open ends, each of said cover means having an opening therethrough communicating with interior of casing from exterior thereof,
c. gasket means interposed between said cover means and casing open ends,
d. a first fluid flow passageway through a wall of said casing in the proximity of one end thereof and a second fluid flow passageway through a wall of said casing in the proximity of its other end,
e. a self-standing bipolar electrode assembly of a plurality of at least two cells contained within said casing such that longitudinal axis of said electrode assembly substantially registers with longitudinal axis of said casing, said cell including arrays of interleaved electrode plates consisting of anode plates and cathode plates supported by a framework comprising
  i. at least one electrically non-conductive partition disposed normally to said casing longitudinal axis and spaced intermediate the ends of said electrode assembly, said partitions serving to baffle said cells and provide cell compartments therefor
  ii. a conducting stud provided at each end of said framework to engage said opening provided in each of said cover means to provide a projecting positive binding post and a projecting negative binding post, and
  iii. gasket means interposed between said conducting studs and said cover means.

2. Apparatus of claim 1 wherein said partitions are provided with electrically conducting electrode support blocks on each side thereof,
means for electrically coupling said electrode support blocks through each of said partitions,
an electrode end support block secured to each of said conducting studs,
a pair of bracket members, at least one of which is electrically non-conductive, one each of said bracket members being secured to each of said end support blocks,
at least two longitudinally disposed spaced tie rods secured to said bracket members and passing through said partitions,
electrically non-conductive spacers engaged about said tie rods between said partitions and between each of said bracket members with its adjacent partition, said tie rods and spacers providing substantially equal spacing between said partitions, and between each of said bracket members with its most adjacent partition,
combination clamping and electrical coupling means associated with each of said electrode support blocks and electrode end support blocks for securing and coupling said anode plates and cathode plates in interleaved arrays to each other and to said support blocks.

3. Apparatus of claim 2 wherein each of said plurality of cells is substantially isolated electrically and hydraulically by said electrically non-conductive partitions, said partitions having an overall clearance of approximately 0.016" therearound when disposed within said casing, said partitions containing fluid flow passageways for regulating fluid flow of electrolyte therethrough.

4. Apparatus of claim 2 wherein said casing is cylindrical in form and is substantially comprised of plastic pipe and plastic pipe flanges.

5. Apparatus of claim 2 wherein said electrode end support block connected to said projecting positive binding post and said electrode support blocks on sides of said partitions disposed toward said negative binding post support and electrically couple anode plates, and said electrode end support block connected to said projecting negative binding post and said electrode support blocks on sides of said partitions disposed toward said positive binding post support and electrically couple cathode plates, said anode and cathode plates engaging one another in an interleaved relationship to form at least one electrode array per cell.

6. Apparatus of claim 5 wherein said anode plates and said cathode plates are rectangularly shaped, said anode plates and said cathode plates having their longer axes substantially longer than their shorter axes, said longer axes aligned in parallel relationship in said electrolyzer apparatus with said longitudinal axis of said casing, said anode plates and said cathode plates having main electrode surfaces vertically oriented.

7. Apparatus of claim 6 wherein said partitions contain gas-electrolyte flow orifices therethrough located in elevation on said partitions immediately above said cell electrode arrays immediately upstream of said partitions and said gas-electrolyte flow orifices being sufficient in size to pass gas therethrough evolving in the cell immediately upstream of said partitions plus additional gas entering said cells from other upstream cells plus a minor amount of electrolyte flow, said partitions also provided with at least one electrolyte flow orifice below top of said cell electrode arrays to accommodate major flow of electrolyte entering one of said fluid flow passageways of said casing.

8. Apparatus of claim 7 wherein at least one of said electrolyte flow orifices for accommodating said major flow of electrolyte is provided at extreme bottom of said partition.

9. Apparatus of claim 5 wherein said partitions are provided with gas-electrolyte flow orifices therethrough disposed immediately above said cell electrode arrays immediately upstream of said partitions, said gas-electrolyte flow orifices being sufficient in size to pass therethrough all gas evolving in cell compartment immediately upstream of said orificed partition plus gas entering said cell compartment from other upstream cell compartments plus electrolyte entering one of said fluid flow passageways of said casing.

10. An electrolytic cell for electrolyzing natural brines in accordance with claim 7 characterized by said vertically oriented anode plates and cathode plates each having
a pair of vertical edges and
a pair of horizontal edges,
wherein said support blocks and combination clamping and electrically coupling means secure and electrically couple said anode plates and said cathode plates at their respective supported edges, said supported edge being one of said vertical edges to thereby provide unsupported vertical electrode edges, said unsupported vertical electrode edges and said supported vertical edges of immediate subjacent and superjacent electrode plates being laterally displaced to provide clearance between said unsupported edges and said support means,
notches provided in said vertical supported edges in at least said anode plates, depth of said notches being coextensive with unsupported vertical edge of immediate subjacent and superjacent plates,
at least one inlet orifice in said partition upstream of said cell compartment provided for directing incoming electrolyte flow into said notches and against coextensive edges of said anode and cathode plates.

11. Apparatus of claim 10 wherein said cathode plates are notched similarly to said anode plates.

12. Apparatus as described in claims 10 or 11 wherein multiple discharge means are provided adjacent top of said cell compartment for discharging electrolyte and gas therethrough.

13. Apparatus of claim 10 or 14 wherein said notches are rectangularly shaped and vertical dimension of said notches comprises approximately 50% of dimension of said vertical edge along which edge said notch is provided.

14. Apparatus as described in claims 10 or 11 wherein said interleaved anode and cathode plates are disposed such that bottom edges thereof are coextensive,
an inlet nozzle disc disposed in said chassis to intercept inlet flow from one of said casing fluid flow passageways and wherein said inlet nozzle disc directs incoming electrolyte flow toward said bottom edges.

15. Apparatus of claim 2 wherein gas relief passageways are provided in upper portions of said casing to relieve process gas to outside thereof.

16. Apparatus of claim 15 wherein each of said gas relief passageways is provided with a limiting orifice, said limiting orifices being of sufficient size to pass all gas flow arriving thereat plus a minor flow of electrolyte.

17. Apparatus of claim 2 wherein at least two of said electrolyzers are supported in vertical arrays such that said electrolyzers are positioned and registered immediately above one another with most upstream cell thereof being in bottommost position and with most downstream cell thereof being in a topmost position, said electrolyzers having internal fluid connections and external inter-connections arranged and adapted to provide serial flow through each of said cells,
said electrolyzers having external electrical conductors attached thereto for electrically interconnecting said electrode assemblies within each of said electrolyzers through said conducting studs.

18. Apparatus of claim 17 wherein eight cells are equally apportioned in four electrolyzers having substantially identical geometries wherein 25% of most upstream cells are coupled serially with 25% of most downstream cells to form an upstream-downstream cell series, remaining cells of said electrolyzers are coupled electrically serially,
and a single voltage source is impressed across said upstream-downstream series and said remaining cell series.

19. Apparatus of claim 18 wherein more than 8 cells are equally apportioned in four electrolyzers.

20. Apparatus of claim 18 wherein more than 8 cells are equally apportioned in more than 4 electrolyzers.

21. Electrolyzer apparatus in accordance with claim 1 for electrolyzing synthetic brine wherein said cell compartments are hydraulically serially interconnected, one of said fluid flow passageways of said casing providing a connection into most upstream cell compartment for the introduction of concentrated brine,
another fluid flow passageway through said casing into said most upstream cell compartment providing a connection for the introduction of a first fraction of dilution water,
additional fluid flow passageways through said casing into additional downstream cell compartments providing connections for introduction of remaining fractions of said dilution water, said second fluid flow passageway of said casing providing a discharge path for said concentrated brine and dilution water flow.

22. Electrolyzer apparatus in accordance with claim 21 for electrolyzing synthetic brine wherein at least two of said electrolyzers are supported in vertical arrays, and wherein said cell compartments are hydraulically serially interconnected, one of said fluid flow passageways of upstream casing providing a connection into said most upstream cell compartment for the introduction of concentrated brine, another fluid flow passageway through said upstream casing into said most upstream cell compartment providing a connection for the introduction of a first fraction of dilution water, additional fluid flow passageways through said casings into additional downstream cell compartments providing connections for introduction of remaining fractions of said dilution water, one of said fluid flow passageways of said downstream casing providing a discharge path for said concentrated brine and dilution water flow.

23. Apparatus of claims 21 or 22 wherein said concentrated brine comprises approximately 26.4% sodium chloride by weight and total dilution water flow rate is approximately 10 times concentrated brine flow rate.

24. Apparatus of claims 21 or 22 wherein said concentrated brine and said first fraction of dilution water are mixed before entering said upstream compartment.

25. Apparatus of claims 21 or 22 wherein each of said fractions of dilution water is approximately equal to each other and said equal fractions are separately introduced such that equal numbers of hydraulically serially connected cells exist between cell compartments wherein said dilution water is introduced, and between the cell compartment of the last added fraction and cell compartment having said discharge connection.

26. Apparatus of claims 21 or 22 wherein orifices are provided in said dilution water inlet connections to apportion and regulate said dilution flows to predetermined rates.

* * * * *